Figure 1:
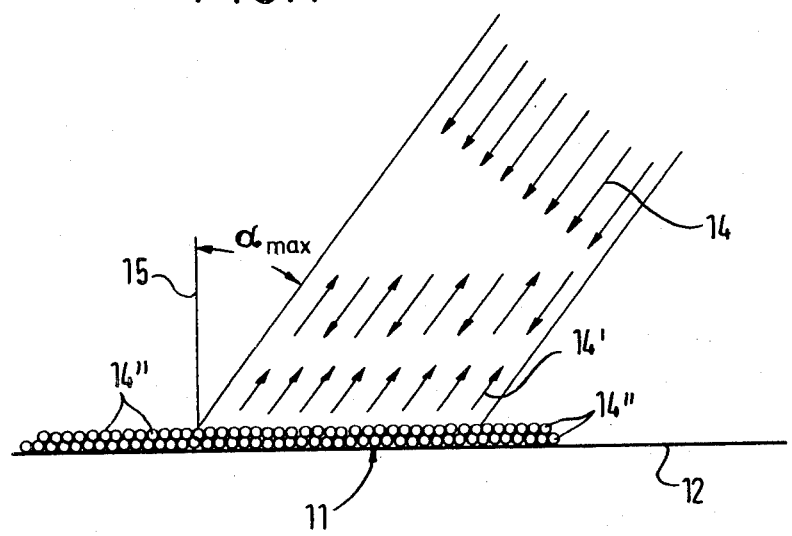

United States Patent [19]

Sick et al.

[11] Patent Number: 4,464,014

[45] Date of Patent: Aug. 7, 1984

[54] RETROREFLECTORS, ESPECIALLY FOR BEAM SCANNING APPLICATIONS AND BEAM SCANNING APPARATUS INCORPORATING SUCH RETROREFLECTORS

[75] Inventors: Erwin Sick, Icking; Günter Fetzer, Gundelfingen; Hermann Winterer, Freiburg, all of Fed. Rep. of Germany

[73] Assignee: Erwin Sick GmbH Optik-Elektronik, Fed. Rep. of Germany

[21] Appl. No.: 367,235

[22] PCT Filed: Aug. 6, 1981

[86] PCT No.: PCT/EP81/00115

§ 371 Date: Apr. 2, 1982

§ 102(e) Date: Apr. 2, 1982

[87] PCT Pub. No.: WO82/00528

PCT Pub. Date: Feb. 18, 1982

[30] Foreign Application Priority Data

Aug. 6, 1980 [DE] Fed. Rep. of Germany ....... 3029794

[51] Int. Cl.³ ..................... G02B 5/124; G02B 5/128; G02B 17/00
[52] U.S. Cl. .................................... 350/105; 350/103; 350/590
[58] Field of Search ................... 350/97, 99, 103, 105, 350/589, 590

[56] References Cited

U.S. PATENT DOCUMENTS

| 3,806,222 | 4/1974 | Knappe | 350/103 |
| 3,945,714 | 3/1976 | Walter | 350/103 |
| 4,123,140 | 10/1978 | Ryan et al. | 350/105 |
| 4,263,345 | 4/1981 | Bingham et al. | |

FOREIGN PATENT DOCUMENTS 107799 3/1968 United Kingdom ............... 350/105

Primary Examiner—Bruce Y. Arnold
Assistant Examiner—William Propp

[57] ABSTRACT

A retroreflector consists of a support surface 12 coated with a layer 11 of small retroreflecting particles such as glass spheres. The support surface comprises a plurality of regularly repeating, alike, structural elements 13 which are inclined to the overall plane of the retroreflector. The surface elements 13 can be of various shapes and serve to increase the angular range over which retroreflection can occur. The optical characteristics of the proposed retroreflectors can be tailored so that they are eminently suitable for use in certain beam scanning applications such as continuous monitoring of doorways and windows by an optical beam scanning device located at one corner thereof in order to detect, for example, intruders.

5 Claims, 18 Drawing Figures

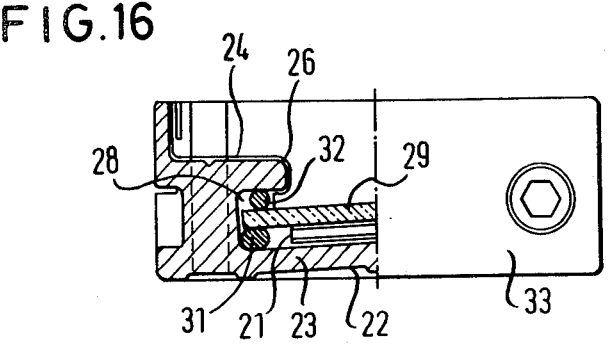
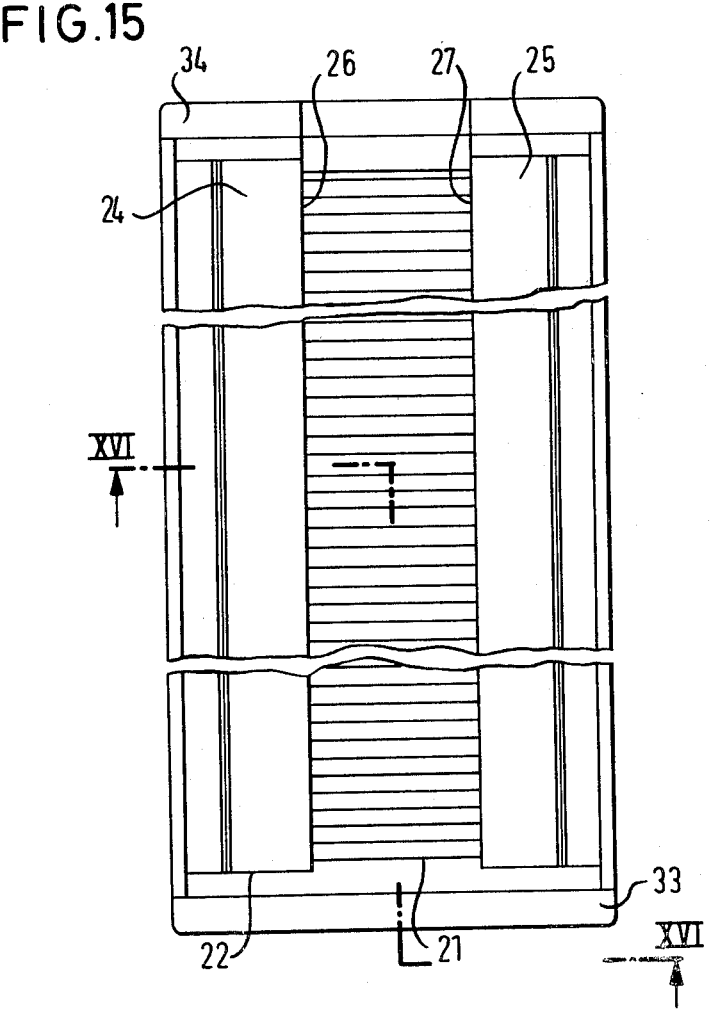

RETROREFLECTORS, ESPECIALLY FOR BEAM SCANNING APPLICATIONS AND BEAM SCANNING APPARATUS INCORPORATING SUCH RETROREFLECTORS

The present invention relates to retroreflectors especially for beam scanning applications, and to beam scanning apparatus incorporating such retroreflectors. Various types of retroreflectors are known, in particular, so-called triple mirrors and retroreflecting foils such as the foil sold under the "Scotchlite" trademark.

In comparison with mirrors retroreflectors have the property that they reflect a light beam back on itself not only at normal incidence but also when the light beam is incident within a predetermined angular range around the main angle of normal incidence. As a result of this property retroreflectors are well suited to a variety of different applications. By way of example, retroreflectors are particularly useful for road signs in order to make the latter readily visible at night and for retroreflective safety devices for motor vehicles and road users. Retroreflectors are also used with light barriers and with beam scanning apparatus such as the beam scanning apparatus used for generating light grids and light curtains.

For these applications it is particularly advantageous that the retroreflector and the light transmitter/receiver of the beam scanning apparatus do not need to be accurately aligned.

For beam scanning applications interest has, in the past, been centered on the triple mirror type of reflector which is a product of high optical quality and, accordingly, is relatively expensive to manufacture.

For cost and technical reasons there is also a great deal of interest in retroreflecting tapes and foils which consist of small retroreflecting particles, in particular glass spheres or beads which are mounted in closely packed form on a substrate such as a plastic foil. The small retroreflecting particles are in particular glass spheres and have substantially the same characteristics as a triple mirror, i.e. they reflect the incident light back on itself. The angular range in which incident radiation is reflected back on itself depends on the angle of incidence of the incident radiation. The customary retroreflecting materials (such as the retroreflecting tape sold under the trademark "Scotchlite") exhibit the retroreflecting property (i.e. the property of reflecting light back on itself) over a range depending on the type of material from ±20° to ±50° relative to the direction of normal incidence. There are, however, a series of applications for which this angular response range of the retroreflector is not acceptable. In order to overcome the relatively pronounced directional dependence which is associated with reflection at retroreflectors attempts have already been made to sub-divide a retroreflector consisting of triple mirrors into individual elements (DE-PS No. 22 36 482). In this arrangement the individual retroreflecting elements are inclined to one another at increasing angles to that the scanning light beam of a light curtain impinges as closely as possible to normal incidence on the individual triple elements which are more directionally dependent than the aforementioned retroreflecting foils. The known retroreflector with retroreflecting elements inclined at increasing angles to one another is however only suitable for use with a sector-shaped scanning beam. Each individual retroreflector element must also be set at a predetermined position relative to the scanning beam and this makes it difficult if not impossible to manufacture the retroreflector by cost-effective mass production techniques.

The principal object underlying the present invention is to provide a retroreflector based on the use of tightly packed retroreflecting particles in which the directional dependence of the retroreflector is reduced sufficiently that retroreflecting properties are obtained over a larger angular range of incident light with light incident at each angle within this angular range being preferably reflected back on itself.

It is a further object of the present invention to provide a retroreflector which results in only a minimal loss of intensity of the retroreflected beam relative to the incident beam over a large range of angles of incidence.

It is a yet further object of the present invention to provide a retroreflector which can be readily manufactured in an endless manufacturing process.

A further object to the present invention is to provide a retroreflector with predetermined and selectable retroreflecting properties. In other words, the response characteristics of the retroreflector as a function of the angle of incidence should be selectable at will.

A further object of the present invention is to provide a retroreflector based on the use of retroreflecting particles which is protected against contamination of the retroreflecting surface without significantly impairing the desired retroreflecting properties thereof and in particular without significantly attenuating the intensity of the retroreflected beam.

It is also an object of the present invention to provide a retroreflector which is eminently suitable for use in beam scanning apparatus particularly for monitoring doorways, windows and the like.

In order to accomplish the above objects there is provided, in accordance with the present invention, a plane retroreflector with a layer consisting of small retroreflecting particles, in particular glass spheres, said layer reflecting light beams incident in a predetermined angular range around a main angle of incidence back on themselves without significant attenuation, characterized in that the predetermined angular range is enlarged by a surface structure of the layer which differs in angle, at least in part, from the plane of the reflector.

The term "plane retroreflector" as used in the sense of the present invention will be understood to cover, by way of example, retroreflecting strips which differ to a greater or lesser degree from the plane form as a result of gentle concave or convex structure or as a result of wave-like construction.

It is particularly advantageous if the structure consists of a plurality of concavely curved and in particular part-cylindrical surfaces arranged alongside one another. Depending on the angle over which the concavely curved surfaces extend the main angle of incidence can be displaced by a large amount from the normal direction.

It is also possible for the structure to comprise a plurality of plane surfaces arranged alongside one another and inclined in alternate directions relative to the plane of the reflector. This embodiment is favourable from a technical manufacturing view point and is characterized by the fact that fairly uniform reflection conditions are obtained over a relatively large angle.

The described symmetrical structures have the characteristic that the same reflective behaviour is obtained for positive and negative angles of incidence (related to the normal to the plane of the retroreflector).

A further advantageous embodiment is characterized in that the structure consists of surfaces arranged at an angle to one another of which at least each alternate one is concavely curved. Whereas in the previously described embodiments the same retroreflecting behaviour is present symmetrically on both sides of the normal, the present embodiment results in different retroreflecting characteristics on both sides of the normal plane of the retroreflector for the angles of incidence of the same absolute value.

It is also possible for the structure to consist of a plurality of surface elements packed closely together whereby the surface elements can be of part spherical form. As, in this case, dead zones would be present between the closely packed part spherical recesses it is advantageous if the surface elements define hexagonline recesses with the reflecting layer dropping away from the sides of the individual hexagons to their centers either in a straight line or with a light concave curvature. In this case the entire reflector surface can be constructed of reflecting, inclined, triangular regions. The individual hexagonal reflector elements must not be confused with the customary triple mirrors because a triple mirror has plane reflection surfaces whereas the hexagonal arrangement of the present invention has triangular surfaces which are filled with a large number of small retroreflecting particles and especially glass spheres.

Furthermore, care must be taken, in selecting the size of the individual structural elements of the retroreflector of the invention, that the periodicity, strip width or extent of the surface elements is small in relation to the effective cross-section of a light beam which is used with the retroreflector.

It will be appreciated that the retroreflecting surface will be susceptible to contamination as a result of the numerous small crevices which exist between the individual retroreflecting particles which will tend to trap dust particles etc. In order to prevent such contamination it is proposed, in accordance with a preferred embodiment of the present invention, that the retroreflector should be mounted in a housing, such as a rail, and sealed by a transparent plate which is supported and located by the housing. In this way the need to support the transparent cover on the retroreflector itself is avoided. This means that the lines of contact between the individual surface elements of the retroreflector which would otherwise form the support for the transparent cover can be kept to a minimal line width thus maximizing the intensity of the retroreflected beam over the range of angles of interest. Furthermore, the use of adhesive to secure a transparent cover to the points of support on the retroreflector surface can also be avoided. The use of adhesive would be very undesirable as, quite apart from contamination problems, it could seriously reduce the intensity of the retroreflected beam.

Retroreflectors of the abovementioned kind are admirably suited for use in beam scanning apparatus for monitoring doors and passages, for checking the positions of containers, and for checking pellets and the fronts of shelving etc. for the presence of projecting parts for example in automated stores.

Figure 2:
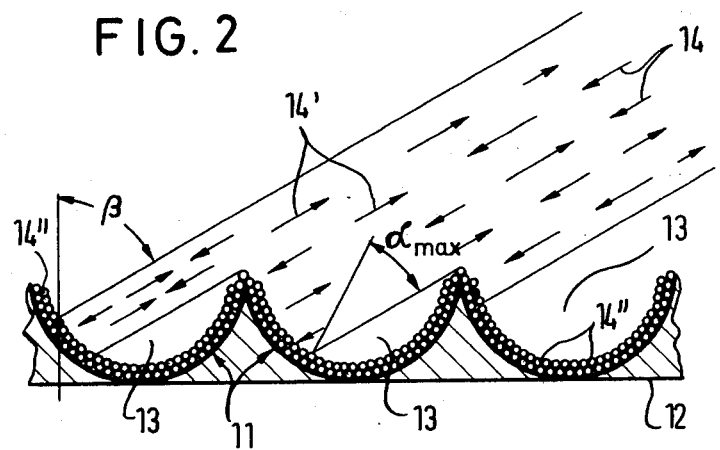
Figure 3:
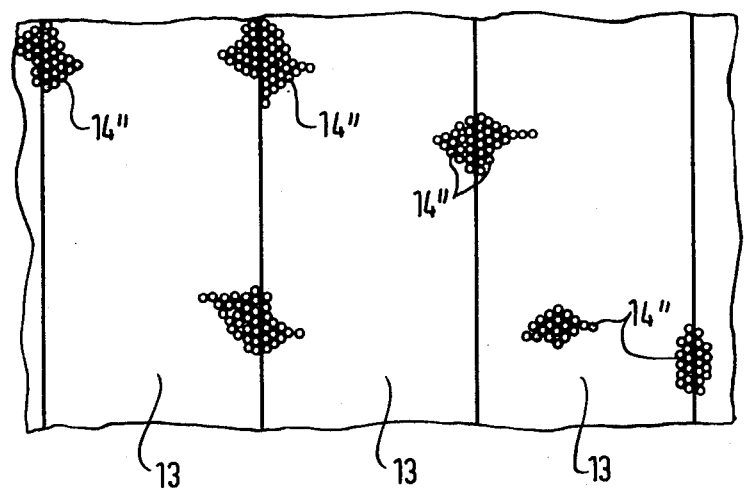
Figure 4:
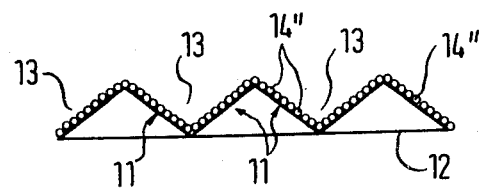
Figure 5:
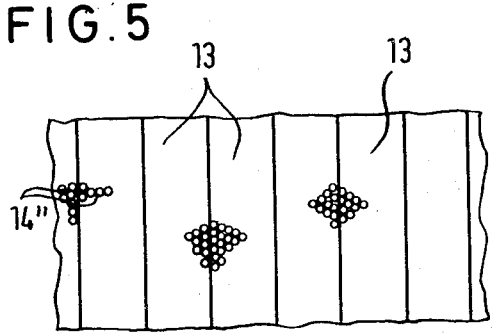
Figure 6:
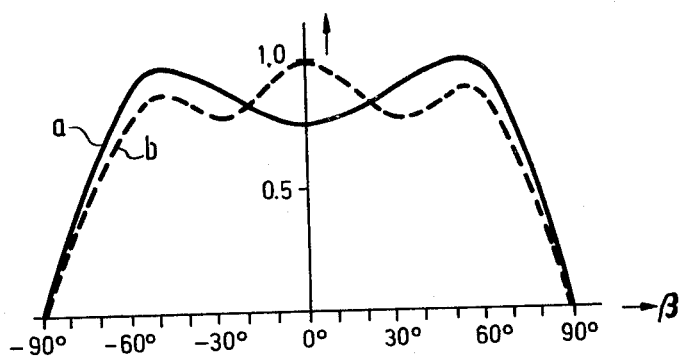
Figure 7:
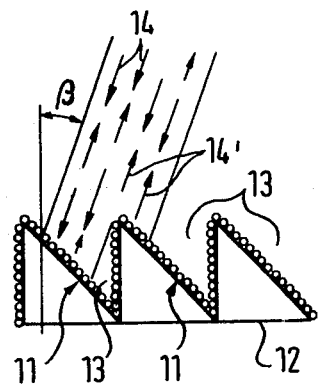
Figure 8:
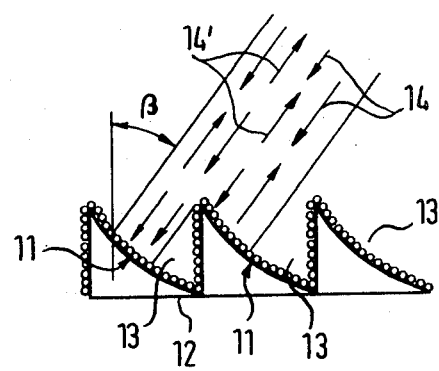
Figure 9:
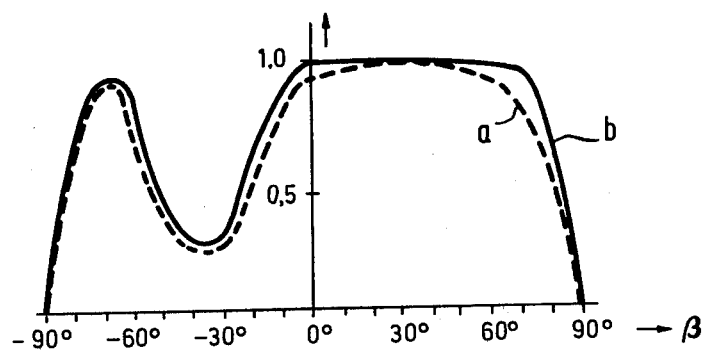
Figure 10:
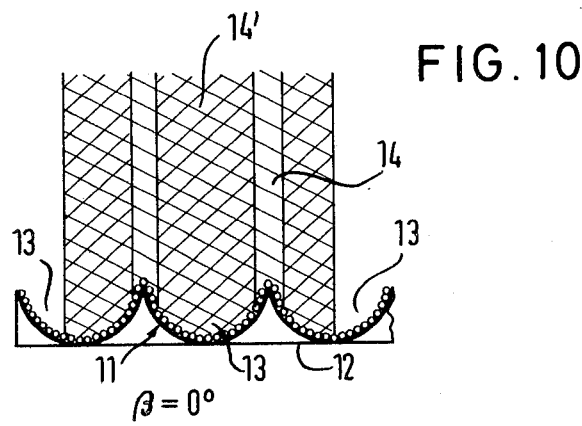
Figure 11:
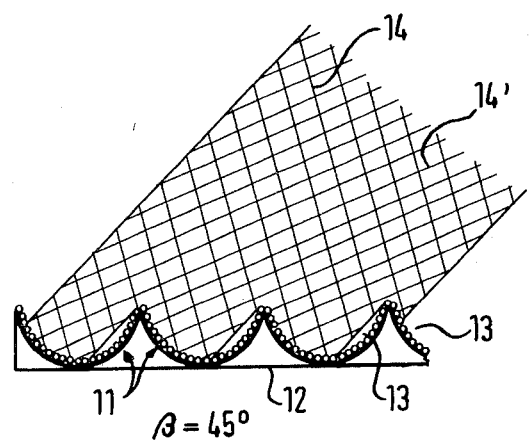
Figure 12:
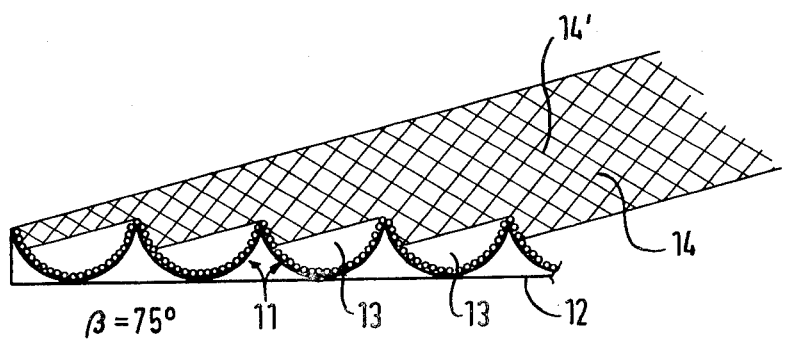
Figure 13:
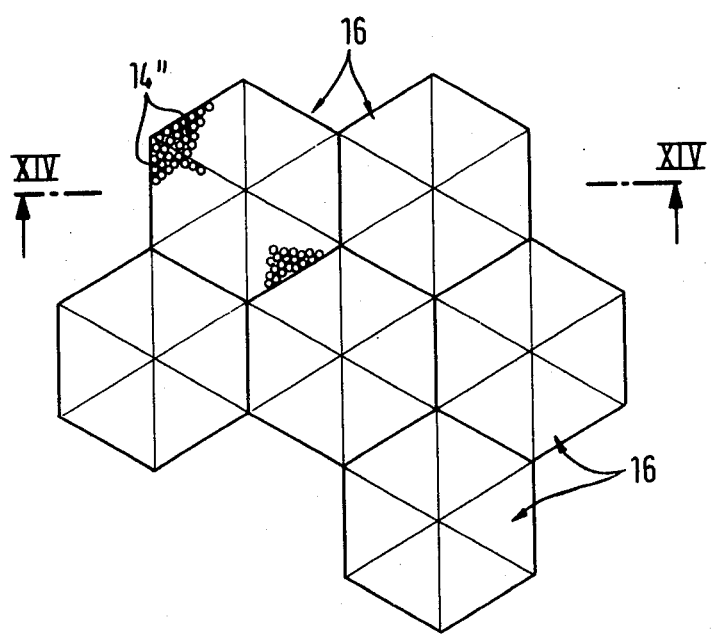
Figure 14:
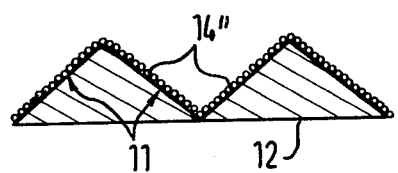

The invention will now be described by way of example and with reference to the drawing which shows:

FIG. 1 a known plane retroreflector in a sectioned side view and also a light beam which is incident on and reflected from the retroreflector, FIG. 2 a view similar to FIG. 1 but of a retroreflector in accordance with the invention, FIG. 3 is a plan view of the subject of FIG. 2, FIG. 4 is a cross-section through a further embodiment of a retroreflector in accordance with the invention, FIG. 5 is a plan view of the subject of FIG. 4, FIG. 6 diagrams of the relative efficiencies of the retroreflectors of FIGS. 2 and 3, and 4 and 5 in dependence on the angle of incidence $\beta$ of the beam of light, FIG. 7 a cross-section of a further retroreflector in accordance with the invention, FIG. 8 a modification of the retroreflector of FIG. 7, FIG. 9 diagrams of the relative efficiencies of the retroreflectors of FIGS. 7 and 8 in dependence on the angle of incidence $\beta$, FIGS. 10 to 12 views similar to FIG. 2 with angles of incidence of 0°, 45° and 75°, FIG. 13 a plan view of a further advantageous embodiment of a retroreflector in accordance with the invention and FIG. 14 a section on the line XIV—XIV of FIG. 13.

Figure 17:
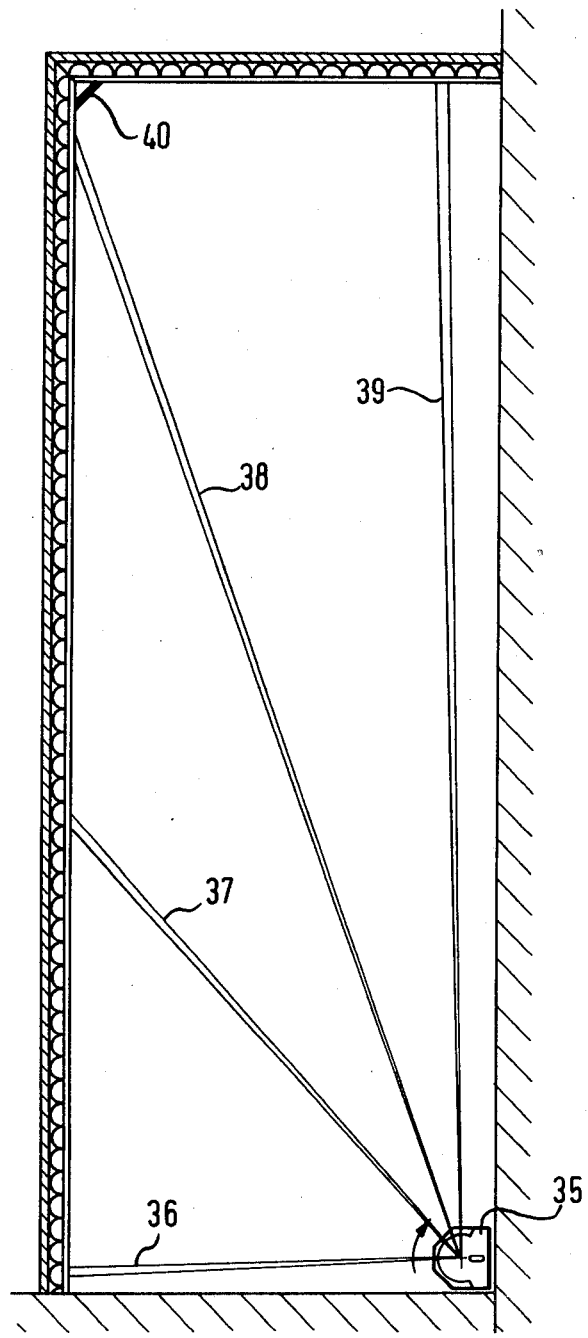
Figure 18:
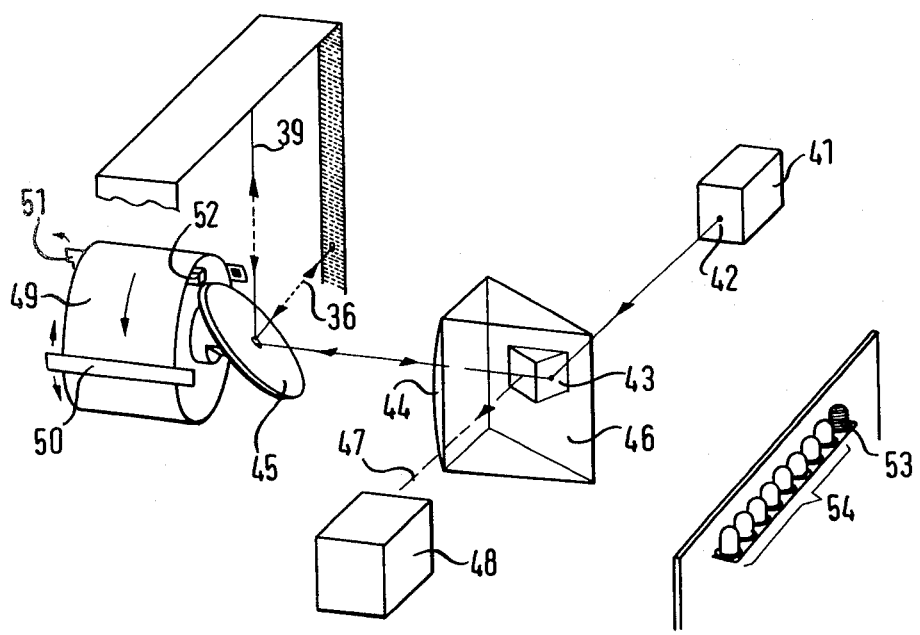

FIG. 15 a plan view of the retroreflector of FIG. 2 mounted in a housing,

FIG. 16 a composite view showing, on the left hand side a half section taken on the line XVI—XVI of FIG. 15 about the line of symmetry of the housing and, on the right hand side an end view of half of a cover plate used to seal one end of the housing, FIG. 17 an illustration showing the use of the retroreflector of FIG. 15 in conjunction with a beam scanning device for monitoring a doorway, FIG. 18 an exploded view of the beam scanning apparatus of FIG. 17.

Turning firstly to FIG. 1 there is shown a number of retroreflecting particles which are closely packed together on a flat surface or reflecting plane 12. The particles jointly form a flat retroreflecting layer 11. If a light beam 14 impinges on a retroreflecting layer of this kind at an angle $\alpha$ it is reflected back on itself in the form of the light beam 14'. This retroreflecting characteristic is however restricted to an angle $\alpha_{max}$ which is dependent on the retroreflecting material that is used. In general a substantially uniform, almost 100%, reflection is obtained within an angular range from ±30° to 40° about the normal 15 to the plane of the retroreflector. Beyond 50° the intensity of the reflected light beam 14' drops away rapidly and almost reaches the value 0 at about 75°.

It is important that the effective cross-section of the light beam 14 is substantially larger than the particles 14" of the retroreflecting layer 11. Thus numerous retroreflecting particles 14" are jointly involved in producing retroreflection.

FIGS. 2 and 3 show a retroreflector in accordance with the invention which consists of cylindrically concave, curved, strip-like retroreflecting layers 11 which lie closely adjacent one another. The normal to each specific point of the retroreflector thus corresponds in each case to the radius of the associated cylinder. The parallel strips on the surface of the retroreflector which result from the side by side arrangement are designated with the reference numeral 13 in FIG. 2.

If the incident light beam 14 falls on the reflector at an angle $\beta$ which is significantly larger than the angle $\alpha_{max}$ in FIG. 1 the individual parts of the light beam fall, as shown in FIG. 2, in part normally and in part at angles which differ only slightly from the normal to the retroreflecting layer at the point of incidence so that a very intensive reflection of the light beam 14 back on itself occurs although the angle $\beta$ lies significantly beyond the maximum angle $\alpha_{max}$ for the particular retroreflecting material.

One notes from FIG. 2 that the lowermost regions of the individual, strip-like, half cylinders 13 on which the light beam 14 falls are inclined at the angle $\alpha_{max}$ in relation to the local normal to the reflector surface.

It should be noticed that the lines of contact between the individual surface elements (half cylinders 13) are very narrow lines rather than flat surfaces. If this were the case a significant portion of the light falling on the retroreflector would fall on the flat surface at an angle greater than $\alpha_{max}$ relative to the normal to the surface and would not be subjected to retroreflection.

The diagram (a) shown in FIG. 6 represents the relative efficiencies of the retroreflector of FIGS. 2 and 3 in dependence on the angle $\beta$. It can be seen that the intensity of the reflected light beam 14' at angles around 0° is indeed reduced, but that two maxima, which correspond to the displaced main angle of incidence, are present at around 50°. The intensity of the retroreflected beam is still considerable even at angles which are only slightly less than 90°.

FIG. 10 shows a light beam 14 which impinges perpendicularly on the retroreflector of FIGS. 2 and 3. This light beam 14 is illustrated by cross-hatching which extends from top let to bottom right. The reflected light beam 14' is illustrated by cross-hatching which extends from top right to bottom left. If can be seen that for an angle of incidence $\beta=0°$ gaps are present in the reflected light beam 14' at those positions where the individual strips 13 abut one another. These dead zones are not however present at the angles of incidence $\beta=45°$ or $\beta=75°$ shown in FIGS. 11 and 12. The retroreflector of FIGS. 2 and 3 is thus particularly suitable for applications where the angle of incidence lies in the range between +40° and +80° or −40° and −80°.

FIGS. 4 and 5 illustrate a retroreflector in which plane inclined surface elements are arranged in roof-like form at opposite angles on the reflector plane 12 so that a zig-zag structure consisting of parallel abutting strips 13 results.

The diagram (b) in FIG. 6 shows the relative efficiency of this retroreflector. With a suitable choice of the ridge angles one can avoid a dead zone at an angle of incidence of 0° so that a maximum is present at 0° in the diagram of FIG. 6. In contrast a dead zone occurs between 0° and the angle at which the direction of incidence is the same as the inclination of the strips. Beyond this angle of incidence the dead zone is once again not present. Accordingly there are two subsidiary maxima in diagram (b). The distinction over FIGS. 2, 3 and diagram (a) lies in the fact that in FIGS. 2, 3 (diagram a) the minimum occurs at 0° because a dead zone is present at this angle whereas, for the reflector profile of FIGS. 4 and 5 (diagram b), the minimum lies at around 30° to 40°. In many cases it is however important, if a minimum has to be present, that it occurs at 0° and not at another angle because when using rotating beam devices, for example, the shortest reflector spacing always occurs at 0° and not at an angle which deviates therefrom.

Whereas FIGS. 2 to 5 show symmetrical surface structures FIG. 7 shows an embodiment in which the surface structure can also be asymmetrical. As shown in FIG. 7 the retroreflecting layer 11 is of saw-tooth-like form in cross-section and this results in a relative efficiency curve as illustrated in diagram (a) of FIG. 9. For positive angles of incidence $\beta$ of the light beam a substantially constant retroreflection is obtained. At negative angles a pronounced reduction of the intensity of reflection occurs at angles between −20° and −50°. In compensation however a further reflection maximum occurs at angles around −70° so that the retroreflector of FIG. 7 is particularly suited for special applications where a selection in accordance with FIG. 9 is desired.

FIG. 8 also shows a structure consisting of strips 13 which is very similar to the structure of FIG. 7 but in which the downgoing saw-tooth flanks have somewhat concavely curved regions. In this way a relative efficiency plot as shown in curve b in FIG. 9 is obtained. The intensity of the retroreflected beam is thus more constant at positive angles of incidence $\beta$ than is the case with the embodiment of FIG. 7.

FIGS. 13 and 14 show an embodiment of a retroreflector which is not divided into individual strips but instead into individual hexagonal surface elements 16. The individual surface elements 16 are once again relatively large in comparison with the retroreflecting particles 14'' which are closely packed together to form the retroreflecting layer 11. The hexagonal form ensures that the surface of the reflector plane 12 is fully filled with retroreflecting material. The individual triangular segments of each hexagonal element 16 drop away from the sides of the individual hexagons to their centers as shown in FIG. 14. The main angle of incidence can be displaced in the desired direction by suitable choice of the angle at which the reflecting layer drops away from the sides of the individual hexagons to their centers.

It is also possible to provide recesses of part spherical or circular cone shape.

Two factors control the size of the elements of the structure. One is the depth of the structure the other the dead zones. With a low depth of the structure the structural elements should be very small. The limiting value arises from the sharp edges within the structure.

These edges generally make their presence felt as dead zone and should therefore not occur too frequently within the cross-section of a light beam. On the other hand the size of the elements should be small in comparison with the cross-section of the light beam that is used. It must also be born in mind that when using the retroreflector with a scanning beam the reflected light beam will be modulated as it passes over the surface of the retroreflector. Taking these points of view into consideration it has been found that the structural elements should be approximately 2 to 5 times smaller than the cross-section of the light beam that is used. The cross-sections of typical scanning light beams fluctuate between 20 and 100 mm². There are however applications in which light beam cross-sections of up to 500 mm² are used.

The total reflector plane should be uniformly filled with like structural elements of strip-like or surface-like form which are packed together as closely as possible and with each structural element being filled in its own right as uniformly as possible with retroreflecting particles.

A preferred and practical embodiment of the invention will now be described with reference to FIGS. 15 and 16. In this embodiment a retroreflector 21 which preferably has the form shown in FIGS. 2 and 3 of this specification is embodied in a housing 22. In this case the retroreflector 21 is formed by adhering a flat strip of retroreflective foil to a support surface in the form of a flat strip of aluminium foil. The composite retroreflecting strip, which can clearly be manufactured in an endless manufacturing process, is deformed by an impressing process, for example between a pair of profiled rollers, to form an elongate strip with the profile shown in FIG. 2. The stability of the aluminium foil retains the retroreflector in the desired shape. The crests between the individual surface elements of the retroreflector are arranged as shown in FIGS. 15 and 16 transversely to the longitudinal direction of the elongate housing which is preferably an extruded metal rail. As seen particularly from the cross-section shown in FIG. 16 the extruded metal rail comprises a base portion 23 to which the foil can be attached by means of an adhesive and first and second sidewalls 24, 25. Each of the sidewalls 24, 25 is provided with an elongate lip 26, 27 respectively. The elongate lips 26 and 27 cooperate with the base member to define respective recesses 28 (only one shown) for retaining the side edges of a transparent plate member 29 which prevents the reflector surface becoming contaminated and forms a window located by the housing.

In the illustrated embodiment the transparent plate member is a strip of glass plate and is slid into the housing beneath the lips from one end of the rail. Resilient seals 31 are interposed between each side edge of the transparent plate member and the base member over the full length of the rail or housing. The glass plate is then retained in position by introducing a rod or wire 32 into the space between each lip and the glass plate with the dimensions of the rod, which in practice can conveniently be a steel rod of 2 mm diameter, being chosen so as to slightly compress the seals 31. The underside of the lips 26, 27 can be provided with a small notch or depression which cooperates with the rod to retain the same in position. It will be appreciated that the rods can readily be introduced by pressing downwardly on the glass plate so as to compress the resilient seals 31 which may conveniently be formed by rubber cords. After inserting the rods 32 the resilience of the seals is sufficient to maintain the glass plate firmly and sealingly in position in the rail or housing. The ends of the rail can be sealed by simple end plates 33, 34 which are simply bolted into position. Further seals can be provided between the cover plates and the ends of the rail so as to hermetically enclose the retroreflecting strip 21.

As seen in FIG. 17 the retroreflector of FIGS. 15 and 16 is ideally suited for use with beam scanning apparatus for monitoring a doorway to check for the presence of intruders. In the arrangement shown in FIG. 17 a light transmitting and receiving unit 35 is positioned inconspicuously at the bottom right hand corner of the doorway. Although in the illustration the light transmitting/receiving unit is shown within the doorway it could also be embedded in the material surrounding the doorway. The retroreflecting rail of FIGS. 15 and 16 is arranged along the full length of the left hand side of the doorway as seen in FIG. 17 and along the full length of the top door lintel. The light transmitting/receiving unit continuously and repeatedly sweeps a beam of light 36 in sector-like fashion across the area of the doorway. At sequential times the light beam from the light transmitter/receiver unit will adopt the positions 37, 38 and 39 and of course a large number of intermediate positions. The scanning speed is obviously chosen to be so high that an intruder will be reliably detected. It will be seen that the beams 36 and 39 fall on the retroreflector at substantially normal incidence. Clearly a conventional retroreflector could also be used at these points. The beam 37 falls however on the retroreflector at an angle which is already close to the limiting angle for conventional retroreflectors. The beam 38 which is in this case reliably detected as a result of the special construction of the retroreflector falls on the retroreflector at an angle which would be hopelessly beyond the maximum of conventional retroreflectors. It will be appreciated that the retroreflector shown in FIGS. 15 and 16 and used in the doorway of FIG. 17 is well suited to manufacture in a mass production process.

It will also be appreciated that the arrangement of FIG. 17 can be used for a wide variety of purposes. One could for example consider the doorway of FIG. 17 as being an access window for a press tool. In this case the beam scanning apparatus is used to check for the presence of, for example, a human hand or a tool within the guarded area. In this application there might be a small deadspot just at the junction between the two lengths of retroreflecting strip in the corner opposite the transmitter/receiver unit. In order to reliably detect for example a spanner present in this corner the corner could be bridged by a small auxiliary retroreflector 41.

For the sake of completeness the light transmitter scanning unit of FIG. 17 will now be described briefly with reference to the exploded view of FIG. 18.

As shown in FIG. 18 a luminescent diode light source 41 transmits a pulsed beam of infrared light through an aperture 42 to the transmitter prism 43. The beam of light is deflected through a right angle at the transmitter prism 3 and is directed by a lens 44 onto a mirror 45 which deflects the incident light beam at an angle of 90°. This light is then projected across the doorway onto the retroreflecting strip, which frames a major portion of the boundary of the doorway, and is returned from the retroreflecting strip to the mirror 45. Light returned to the mirror 45 is once again turned through 90° and reflected onto the receiver prism 46 which deflects it in the form of a beam 47 onto a photoelectric detector 48. The mirror 45 is inclined at an angle of 45° to the spindle of a motor 49. Rotation of the mirror 49 causes the beam of light 36 to scan across the doorway in the sector-like manner referred to in connection with FIG. 17. The signal from the photoelectric receiver 48 can then be analysed in wellknown manner to detect the presence of an obstruction within the doorway. The switches 50, 51 which can be triggered by a magnet 52 rotating with the spindle can be used to generate a gating signal which only allows evaluation of the signals from the photoelectric detector 48 in the period in which the scanning beam 36 is scanning the area of the doorway. An indicator lamp 51 can be used to provide a visual indication of obstruction of the light beam 36. Further lamps 52 can be used to facilitate the alignment of the unit with the doorway.

We claim:

1. A retroreflector for use in beam scanning apparatus wherein a light beam is scanned periodically across said retroreflector at varying angles of incidence by a beam scanner, the retroreflector comprising a support structure and a housing for said support structure, said support structure lying generally in one plane and consisting of a plurality of regularly repeating surface elements inclined over a major portion of their surfaces relative to said plane, said surface elements adjoining one another at crests of the support structure and being covered by a layer of retroreflecting spheres the dimensions of which are small in comparison with said surface elements; wherein each said crest is a line of contact of minimal width between neighbouring surface elements of said support structure; and said housing including an elongate extruded rail and a plate member forming a transparent window located by said rail, said rail having a base section for supporting said support structure, said rail also having first and second sidewalls extending alongside said support structure, and respective inwardly facing lips provided on said sidewalls and spaced apart from said base section, wherein said plate member is retained beneath said lips in front of said support structure; and wherein resilient seals are provided between said plate member and said base section adjacent said sidewalls.

2. A retroreflector in accordance with claim 1 wherein respective rod members are interposed between each said lip and said plate member to maintain said resilient seals in a compressed condition.

3. A retroreflector in accordance with claim 2 wherein each of said first and second lips includes a groove in its underside for locating said rod member.

4. A retroreflector in accordance with claim 1 wherein end plates are bolted to ends of said rail.

5. A retroreflector in accordance with claim 1 wherein said support structure is a corrugated structure with said crests extending parallel to one another and at right angles to said base section.

* * * * *